UNITED STATES PATENT OFFICE.

LOUIS ENRICHT, OF CHICAGO, ILLINOIS, ASSIGNOR TO THE UNITED STATES DUROLITHIC COMPANY, OF WEST UNION, IOWA.

MANUFACTURE OF ARTIFICIAL STONE.

SPECIFICATION forming part of Letters Patent No. 486,443, dated November 22, 1892.

Application filed December 15, 1891. Serial No. 415,185. (No specimens.)

*To all whom it may concern:*

Be it known that I, LOUIS ENRICHT, a citizen of the United States, residing at Chicago, in the county of Cook and State of Illinois, have invented a certain new and useful Improvement in the Manufacture of Artificial Stone, (Case No. 5,) of which the following is a full, clear, concise, and exact description.

My invention relates to the process and composition of matter used in the production of cement or artificial stone; and its object is to produce a stone or cement which has magnesium as a base, but which possesses the quality heretofore wanting in magnesium artificial stones of being proof against the attack of atmospheric and climatic influences. In this process I take six ounces of oleic acid or any other oil which can be saponified and pour the same into a cold strong solution of caustic soda and water. I stir the same continually until the oil is thoroughly saponified. I then allow same to stand until the saponified oil rises to the surface and throw it into a vessel containing a solution of magnesium sulphate. Upon agitating the same a precipitate will occur in two or three minutes, which precipitate is an insoluble metallic soap. I add this precipitate to fifty pounds magnesium oxide, ten ounces of saturated solution of aluminium sulphate potassium, and three gallons solution of magnesium chloride of at least 25° Baumé. This material after being thoroughly stirred forms a binding material, to which I add sand, broken stone, sawdust, or other inert substances, which forms a mass in a plastic state that can be cast into molds or applied to walls or other surfaces like plaster. Water may be used to bring the resulting mass to any consistency desired, and the proportions of the above-named ingredients may be changed without seriously-detrimental effects. This material will crystallize and harden into a compact cement or artificial stone capable of withstanding strain and proof against the attacks of carbonic-acid gas and other influences which have hitherto proved disastrous to artificial stone.

The purpose of the above process is to protect the elements of the artificial stone against the actions of atmospheric and climatic influences, and this object is secured by the production of the aluminium palmitate, which is secured by the combination of the metallic magnesium soap with the aluminium-sulphate potassium. This admixture becomes on drying a hard mass perfectly insoluble in hot or cold water and is not attacked by carbonic-acid gas. The composition of this substance evenly, mechanically, and chemically incorporated in artificial stone produces the resistance to atmospheric and climatic influences so much to be desired, and thus secure a strong and lasting stone of great commercial value.

The production of the above-described composition of matter not only produces a quality of stone needed, but gives an entirely-new chemical result, and on account of its cheapness makes a product useful for many purposes.

By varying the addition of inert material to meet the requirements of the uses for which the artificial stone is intended I can imitate any natural stone required. For stone of coarse grain I use coarse unsifted sand or broken stone. For finer and more compact stone for such articles as are used for plumbing-ware—such as bath-tubs, wash-tubs, and cisterns, or other articles which are exposed to the constant use of hot and cold water—I use finely-sifted sand, ground spar, or an admixture of kaolin, flint, and sand. For pavements and floor-covering I use ashes or an admixture of gravel and sand. For filling, bricks I use sawdust, and by the proper use of white sand and the necessary earthen or mineral pigments to color the same I can produce a variety of articles of such different colors as are required.

Having thus described my invention, what I claim as new, and desire to secure by Letters Patent, is—

1. The process of producing cement, which consists of mixing saponified oil with magnesium sulphate, whereby an insoluble metallic magnesium soap is produced, and adding same to magnesium oxide, magnesium chloride, and aluminium-sulphate potassium while in a plastic condition, and while the same is still plastic adding thereto inert material, whereby a cement is produced impervious to moisture and capable of resisting the action of carbonic-acid gas.

2 The herein-described composition of matter for the production of artificial stone, consisting of saponified oil, aluminium palmitate, magnesium oxide, magnesium sulphate, and magnesium chloride, and an inert substance, in substantially the proportions specified.

In witness whereof I hereunto subscribe my name this 12th day of December, A. D. 1891.

LOUIS ENRICHT.

Witnesses:
CHARLES A. BROWN,
GEORGE L. CRAGG.